United States Patent [19]

Arai et al.

[11] Patent Number: 5,048,060
[45] Date of Patent: Sep. 10, 1991

[54] DIGITAL SIGNAL RECEIVING CIRCUIT WITH MEANS FOR CONTROLLING A BAUD RATE SAMPLING PHASE BY A POWER OF SAMPLED SIGNALS

[75] Inventors: Masanobu Arai; Masaru Yamaguchi, both of Tokyo; Takenori Ogata, Miyagi, all of Japan

[73] Assignee: NEC Corporation, Tokyo, Japan

[21] Appl. No.: 271,979

[22] Filed: Nov. 16, 1988

[30] Foreign Application Priority Data

Nov. 16, 1987 [JP] Japan .................... 62-288940

[51] Int. Cl.$^5$ .................... H04B 3/04; H04L 7/02
[52] U.S. Cl. .................... 375/106; 375/96; 375/110; 375/118; 364/728.07
[58] Field of Search .................. 375/96, 106, 110, 118, 375/14, 111; 364/728.07

[56] References Cited

U.S. PATENT DOCUMENTS

| 4,577,329 | 3/1986 | Brie et al. | 375/14 |
| 4,815,103 | 3/1989 | Cupo et al. | 375/14 |
| 4,847,880 | 7/1989 | Kamerman et al. | 375/106 |
| 4,856,030 | 8/1989 | Batzer et al. | 375/106 |

Primary Examiner—Douglas W. Olms
Assistant Examiner—Ralph Smith
Attorney, Agent, or Firm—Sughrue, Mion, Zinn, Macpeak & Seas

[57] ABSTRACT

In a baude rate sampling type receiving circuit for use in a system for transmitting digital data signal at a transmission baude rate, in order to control the sampling phase at the optimum phase, desired elements of an autocorrelation function of a series of baud rate sampled signals are calculated and are linearly summed by a calculating circuit to provide a linear summation as a power of the series of sampled signals. The sampling phase at the baud rate sampling is controlled by a control circuit by use of the linear summation so that the power is maximized, whereby the sampling phase is maintained at the optimum sampling phase.

9 Claims, 3 Drawing Sheets

DIGITAL SIGNAL RECEIVING CIRCUIT WITH MEANS FOR CONTROLLING A BAUD RATE SAMPLING PHASE BY A POWER OF SAMPLED SIGNALS

BACKGROUND OF THE INVENTION

1. Field of the Invention

The present invention relates to a receiving circuit for use in a transmission system of a digital signal with a transmission baud rate, and in particular, to such a receiving circuit of a baud rate sampling type wherein the digital signal is sampled as a received signal at a sampling rate equal to the transmission baud rate.

2. Description of the Prior Art

In the prior art, a transmitter and a receiver in the digital transmission system have been composed of analog circuits. However, according to recent progress of a switched capacitor filtering (SCF) technique and a digital signal processing technique, it has already been possible to treat and process a series of random signals received at a receiver discretely on a time axis.

Such a receiver comprises a baud rate sampler for sampling the received signal at a sampling rate equal to the transmission baud rate to produce a series of sampled signals and a decision circuit for deciding the series of the sampled signals. The sampling manner using the sampling rate equal to the transmission baud rate is called a baud rate sampling. Another sampling manner is also possible wherein the received signal is sampled at a sampling rate twice or more of the transmission baud rate. However, the former enables a signal processing time and a filter tap number to be reduced in, for example, a line equalizer and is therefore superior to the latter.

A difficulty from which the baud rate sampling suffers is control of the sampling phase, that is, timing control for sampling.

As a technique for resolving the difficulty, Müller et al proposed to utilize an impulse response of the series of received signals and a decided result at the decision circuit in their paper "Timing Recovery in Digital Synchronous Data Receiver", IEEE Transaction on communication, VOL. COM-24, NO. 5, MAY 1976 (Reference 1). However, this technique has a problem that correct operation is not expected when the decided result includes many errors, for example, at a training phase of the receiver operation.

Sailer et al proposed another technique to control the sampling phase by use of a special code which is called "Barker Code" in their paper "A VLSI Transceiver for the ISDN Customer Access", Globecom. 1985 (Reference 2). However, it is a problem per se to use the special code.

SUMMARY OF THE INVENTION

Accordingly, it is an object of the present invention to provide a receiving circuit of a baud rate sampling type for use in a digital transmission system wherein baud rate sampling phase can be readily controlled without use of the decided result at the decision circuit and any special code.

The present invention can be applicable to a receiving circuit for use in a transmission system of a digital signal at a transmission baud rate, the receiving circuit comprising a baud rate sampling circuit for sampling the digital signal as a received signal by a sampling signal of a sampling rate equal to the transmission baud rate to produce a series of sampled signals. According to the present invention, the receiving circuit comprises calculating means coupled with the baud rate sampling circuit for calculating a linear summation of predetermined elements of an autocorrelation function of the series of sampled signals as a power of the series of sampled signals, and sampling control means responsive to the power for controlling a sampling phase of the sampling signal so that the power of the series of sampled signals is maximized.

DESCRIPTION OF PREFERRED EMBODIMENTS

Figure 1:
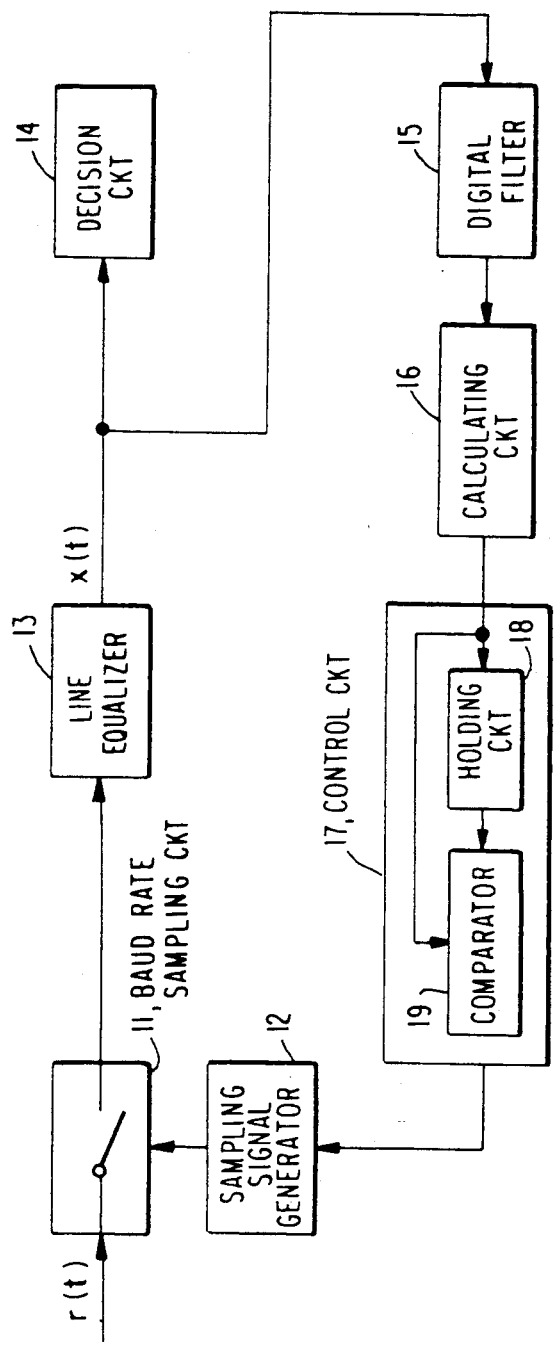
FIG. 1 is a block diagram view illustrating main portions of a receiving circuit according to an embodiment of the present invention.

Referring to FIG. 1, the receiving circuit shown therein receives a data signal r(t) transmitted through a transmission line (not shown) at a transmission baud rate. The receiving circuit comprises a baud rate sampling circuit 11 for sampling the received data signal by a sampling signal to produce a series of sampled signal, a sampling signal generator 12 for generating the sampling signal with a sampling rate equal to the transmission baud rate, a line equalizer 13 for equalizing the series of sampled signals, and a decision circuit 14 for deciding the series of sampled signals after equalized. The baud rate sampling circuit 11, the sampling signal generating circuit 12, the line equalizer 13, and the decision circuit 14 are known in the prior art. Therefore, a description thereto is omitted herein for the purpose of simplification of the description.

According to the present invention, the receiving circuit further comprises a digital filter 15, a calculating circuit 16, and a control circuit 17 for controlling a phase of the sampling signal, that is, a sampling phase at the baud rate sampling circuit 11.

Prior to the description of the functions of the digital filter 15, the calculating circuit 16, and the control circuit 17, the principles of sampling phase control according to the present invention will be described below.

Assuming that $a_n$ represents transmitting symbols from a digital transmitter and that h(t) represents an impulse response of an overall portion from the symbol source in the transmitter to an output of the line equalizer 13, the series of sampled and equalized signals x(t) at an output of the line equalizer 13 is well known in the prior art to be given by:

$$x(t) = \sum_{n=-\infty}^{\infty} a_n \cdot h(t - nT) \tag{1}$$

where T represents an inverse of the baud rate or the sampling rate and corresponds to a sampling interval, n being an integer.

It is also known that autocorrelation function C(iT) of the series of the sampled and equalized signals is given by:

$$C(iT) = E[x(t) \cdot x(t - iT)] \quad (2)$$

where E[X] represents an expectation of X, i being an integer.

Now, assuming that the received signal is sampled at a time $t = kT + \tau$ ($\tau$ being the sampling phase, $0 \leq \tau \leq T$, and k being a natural number), the series of sampled and equalized signals is a function of $\tau$, and Equation (1) is rewritten into the following equation (3):

$$\begin{aligned} x(kT + \tau) &= \sum_n a_n \cdot h(kT + \tau - nT) \\ &= \sum_n a_n \cdot h((k - n)T + \tau) \end{aligned} \quad (3)$$

Providing that $x(kt + \tau)$ and $h(kT + \tau)$ are represented by $x_{k,\tau}$ and $h_{k,\tau}$, Equation (3) is rewritten into:

$$x_{k,\tau} = \sum_n a_n \cdot h_{k-n,\tau} \quad (4)$$

Since x(t) is a function of $\tau$, the autocorrelation function C(iT) is also a function of $\tau$. Therefore, placing $C(iT) = C_i(\tau)$, Equation (2) is rewritten into:

$$\begin{aligned} C_i(\tau) &= E[x(kT + \tau) \cdot x(kT + \tau - iT)] \\ &= E[x_{k,\tau} \cdot x_{k-i,\tau}] \end{aligned} \quad (5)$$

An element $C_0(\tau)$ of the autocorrelation function $C_i(\tau)$ for $i=0$ is obtained to be $C_0(\tau) = E[x^2_{k,\tau}]$ from Equation (5), and it will be understood that $C_0(\tau)$ represents a power of $x_{k,\tau}$.

Figure 2:
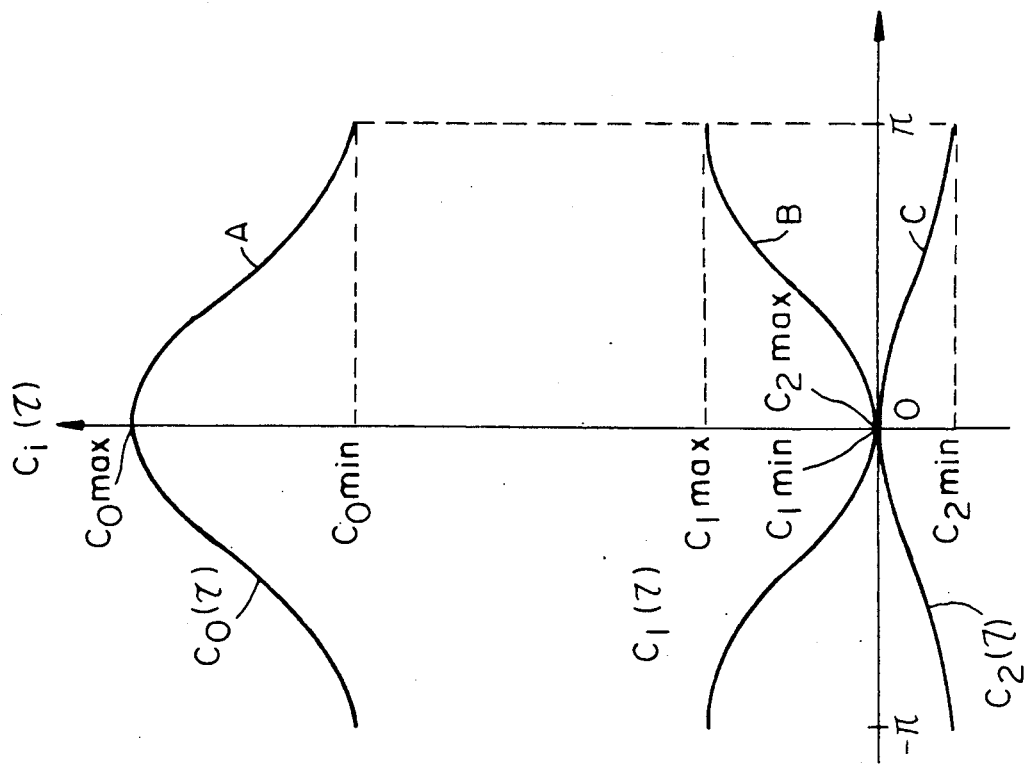
FIG. 2 is a view illustrating a sampling phase response of several elements of an autocorrelation function of a series of baud rate sampled signals.

Using a computer simulation technique, $C_0(\tau)$ in response of the sampling phase $\tau$ was calculated and the calculated result is shown by a curve A in FIG. 2. It will be known from curve A that $C_0(\tau)$ is maximum ($C_0$max) at $\tau = 0$ and is minimum ($C_0$min) at $\tau = \pi$. This means it is possible to sample the received signal at the optimum sampling phase, that is, $\tau = 0$ by controlling the sampling phase so that $C_0(\tau)$ takes the maximum value.

Similarly, other elements $C_1(\tau) = E[x_{k,\tau} \cdot x_{k-1,\tau}]$ and $C_2(\tau) = E[x_{k,\tau} \cdot x_{k-2,\tau}]$ were calculated from Equation (5) for $i=1$ and $i=2$ and are shown by curves B and C, respectively, in FIG. 2. It will be appreciated from curves B and C that $C_1(\tau)$ and $C_2(\tau)$ take the minimum $C_1$min and the maximum $C_2$max, respectively, at the optimum sampling phase and take the maximum of $C_1$max and the minimum of $C_2$min at $\tau = \pi$, respectively. A ratio ($C_1$max/$C_1$min and $C_2$max/$C_2$min) of the maximum and the minimum of each of $C_1(\tau)$ and $C_2(\tau)$ is larger than that ($C_0$max/$C_0$min) of $C_0(\tau)$. Therefore, it will be appreciated that use of summation of two or more elements of the autocorrelation function $C_i(\tau)$ prefers to use of $C_0(\tau)$ alone for detecting the optimum sampling phase.

A linear summation P of the autocorrelation function $C_i(\tau)$ is given by the following equation (6):

$$P = \sum_{i=-\infty}^{\infty} g_i \cdot C_i(\tau) \quad (6)$$

where gi is a weight coefficient. Optimization of gi depends on transmitted pulse duty and some other transmission parameter.

Returning to FIG. 1, the digital filter 15 and the calculating circuit 16 are for obtaining P. In an embodiment, the digital filter 15 has a filtering characteristic of $(1-D)$, and the calculating circuit 16 calculates a power $P_f$ by the following equation:

$$P_f = E[y^2_{k,\tau} - y_{k,\tau} \cdot y_{k-1,\tau}],$$

where $y_k$ is the output of the digital filter 15. Therefore, the overall characteristic of $P_f$ becomes:

$$P_f = 3C_0 - 4C_1 + C_2.$$

However, this is an example and the parameter of gi is not restricted to the above value.

Moreover, in some embodiment, the digital filter 15 is placed in the portion of the line equalizer.

The control circuit 17 controls the sampling phase of the sampling signal at the sampling signal generator 12. In practice, the control circuit 17 slightly changes the sampling phase $\tau$ in response to the calculated result from the calculating circuit 16 and holds the calculated result as a previous calculated result. When the control circuit receives a fresh calculated result as a current calculated result from the calculating circuit 16 after changing $\tau$, the control circuit 17 compares the previous calculated result and the current calculated result to produce an error between the previous and current calculated results. The control circuit 17 controls the sampling phase $\tau$ to thereby make $\tau = 0$. Therefore, the control circuit has a holding circuit 18 for temporally holding the previous calculated result and a comparator 19 for comparing the previous and current calculated results.

Alternatively, the control circuit 17 previously controls the sampling signal generating circuit 12 to thereby change the sampling phase in various phases. The control circuit 17 detects the maximum one of powers calculated by the calculating circuit 16 at the various phases and controls the sampling phase to hold the maximum power.

As described above, the optimum sampling phase can be detected without use of $C_0(\tau)$ but with use of other elements, for example, $C_1(\tau)$ and $C_2(\tau)$ of the autocorrelation function. In that case, the digital filter 15 is not necessary.

Figure 3:
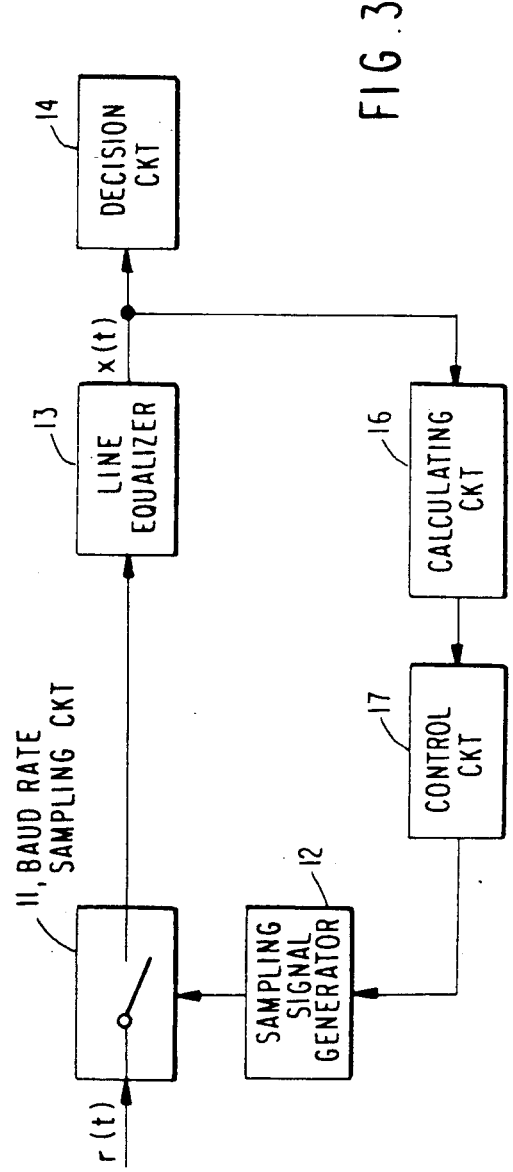
FIG. 3 is a block diagram view illustrating main portions of a receiving circuit according to another embodiment of the present invention.

Referring to FIG. 3, the receiving circuit according to another embodiment is similar to that of FIG. 1 but is different in that the digital filter is not used. The series of sampled and equalized signals $x(t) = x_{k,\tau}$ is supplied to the calculating circuit 16. The calculating circuit 16 calculates a linear summation of predetermined elements of the autocorrelation function $C_i(\tau)$.

Figure 4:
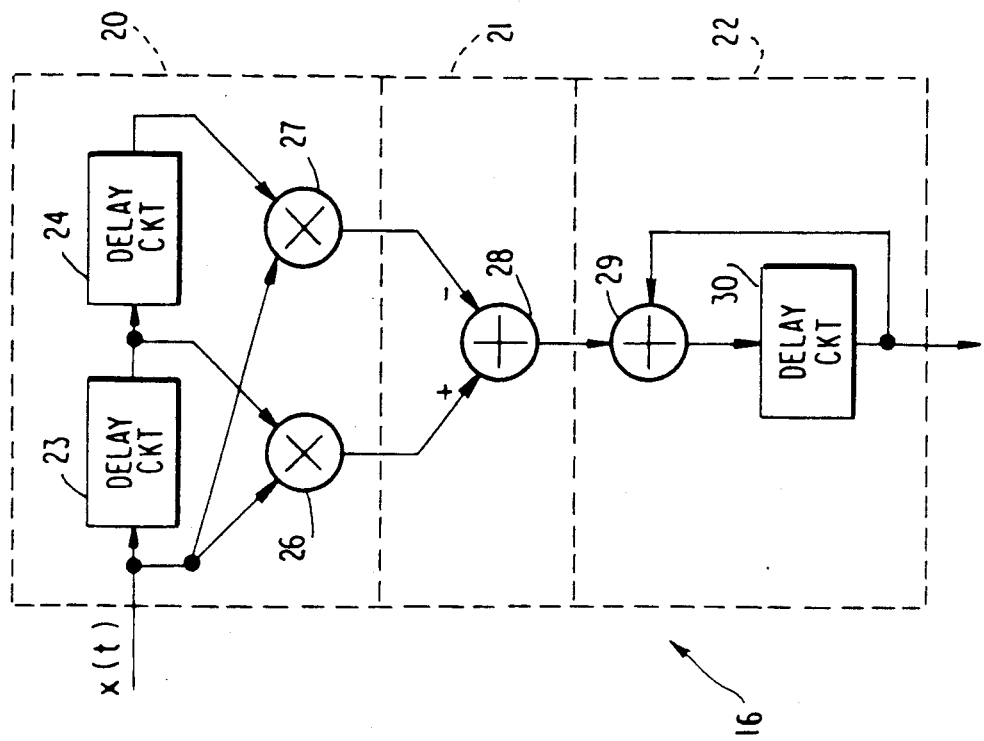
FIG. 4 is a block diagram view of an embodiment of a calculating circuit in FIG. 3.

Referring to FIG. 4, the calculating circuit 16 is for calculating $P_{1,2} = C_1(\tau) - C_2(\tau)$ and comprises a first portion 20 for calculating $C_1(\tau) = x_{k,\tau} \cdot x_{k-1,\tau}$ and $C_2(\tau) = x_{k,\tau} \cdot x_{k-2,\tau}$, a second portion 21 for calculating a linear summation of $C_1(\tau)$ and $-C_2(\tau)$ as $P_{1,2}$, and a third portion 22 for integrating $P_{1,2}$ for a predetermined time period to produce $M \cdot P_{1,2}$, where M is an integration number.

The first portion 20 comprises two delay circuits 23 and 24 each for delaying an input signal by a time period of T and two multipliers 26 and 27. The series of sampled and equalized signals $x(t)=x_{k,\tau}$ from the line equalizer (13 in FIG. 3) is supplied to the delay circuit 23 and the multipliers 26 and 27. The delay circuit 23 produces $x_{k-1,\tau}$ which are supplied to the other delay circuit 24 and the multiplier 26. Thus, the multiplier 26 makes $C_1(\tau)=x_{k,\tau}\cdot x_{k-1,\tau}$. The delay circuit 24 delays $x_{k-1,\tau}$ by T to produce $x_{k-2,\tau}$ which is supplied to the multiplier 27. Therefore, the multiplier 27 makes $C_2(\tau)=x_{k,\tau}\cdot x_{k-2,\tau}$.

The second portion 21 comprises a summing circuit 28 and the third portion 22 comprises an adder 29 and a delay circuit 30 connected in series with each other. An output of the summing circuit 28 is added to an output from the delay circuit 30 to produce an added result which is delayed by the delay circuit 30 to produce a delayed signal as the output from the delay circuit 30. Thus, the delayed signal is integration of the output from the summing circuit 28. The delay circuit 30 is reset after the predetermined time period or when integration is performed by M times.

It will be understood that the calculating circuit 16 can be constructed for calculating a linear summation of desired elements of the autocorrelation function $C_i(\tau)$ by use of known delay circuits, multipliers and summing circuits in the manner analogous to FIG. 4.

Returning to FIG. 3, the calculated result $M\cdot P_{1,2}$ is supplied to the control circuit 17. The control circuit 17 controls the sampling phase of the sampling signal in the manner as described above in connection with FIG. 1.

Figure 5:
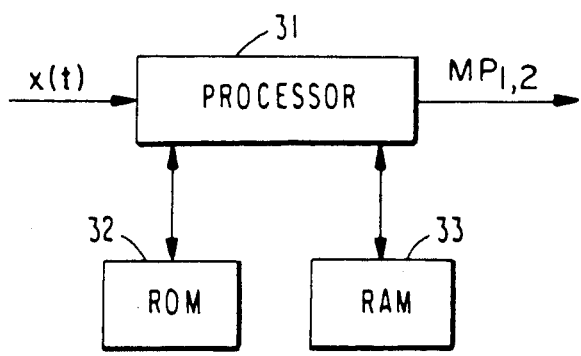
FIG. 5 is a block diagram view of another embodiment of the calculating circuit in FIG. 3.

Referring to FIG. 5, the calculating circuit 16 can also be realized by a combination of a processor 31 for executing calculation of P, a read only memory (ROM) 32 for memorizing a program for the calculation and the weight coefficients gi, and a random access memory (RAM) 33 for storing the series of sampled and equalized signals x(t).

Figure 6:
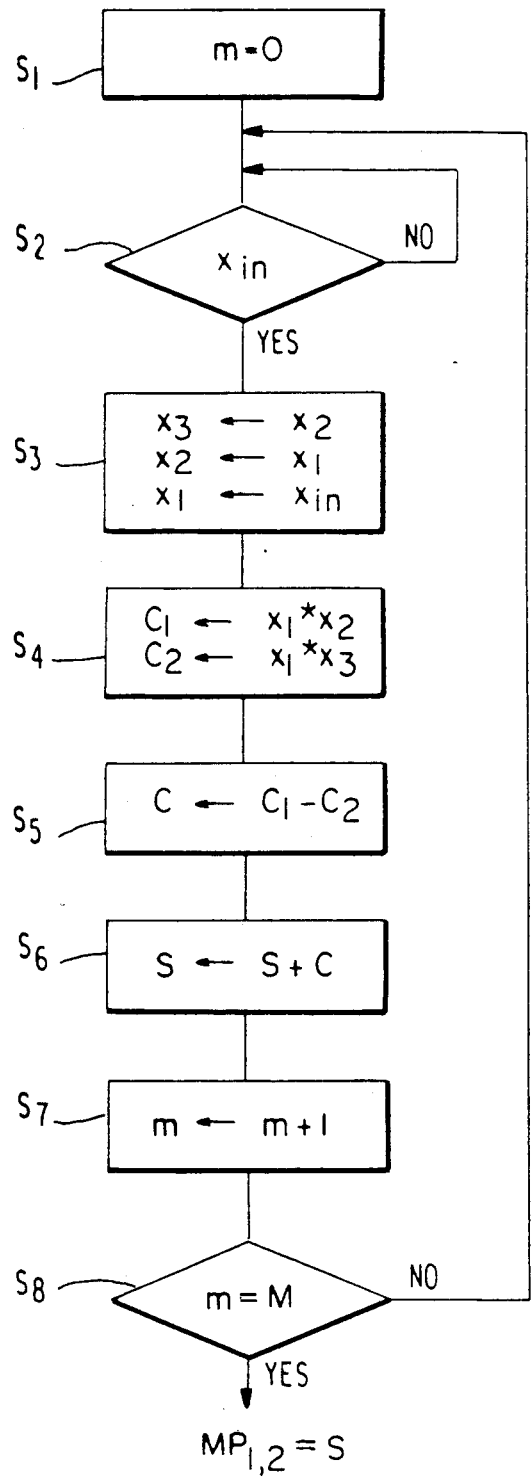
FIG. 6 is a flow chart for explaining operation of the calculating circuit of FIG. 5.

Now, additionally referring to FIG. 6, operation will be described for calculating $M\cdot P_{1,2}$ similar to that calculated by the calculating circuit of FIG. 4.

The processor 31 places m=0 at an initial step S1 according to the program memorized in ROM 32 and checks whether or not a signal is x(t) supplied as an input signal $x_{in}$ thereto from the line equalizer (15 in FIG. 3). When $x_{in}$ is supplied as a first one, the processor 31 stores $x_{in}$ as $x_1$ in RAM 33 as shown in step S3. Then, when the next one of $x_{in}$ is supplied as a second one, the processor 31 stores the second one of $x_{in}$ as $x_1$ in RAM 33 and rewrites the previous one of $x_1$ into $x_2$ at step S3. Thereafter, the processor 31 rewrites $x_1$, $x_2$, and $x_3$ into a current one of $x_{in}$, a previous one of $x_1$, and a previous one of $x_2$, respectively, each supply of $x_{in}$. In this connection, $x_{in}$ is supplied with a time interval of T as described above. Therefore, when $m\geq 3$, $x_2=x_{k-1,\tau}$ and $x_3=x_{k-2,\tau}$ assuming that $x_1=x_{in}$ is $x_{k,\tau}$.

The, the processor 31 performs the calculations of $C_1=x_1\cdot x_2$ and $C_2=x_1\cdot x_3$ at step S4. It will be understood that $C_1$ and $C_2$ correspond to $C_1(\tau)$ and $C_2(\tau)$. At next step S5, weight coefficients gi for i=1 and i=2, that is, g1=1 and g2=−1 and $C=C_1-C_2$ is calculated. Then, the processor 31 executes a calculation of S=S+C at step S6 and adds 1 to m (m=m+1) at step S7. The processes from step S2 to step S7 are repeated for successive input signals $x_{in}$ and S is delivered from the processor 31 as $MP_{1,2}$ when the m=M. Thereafter, the processor 31 places m=0 and repeats the same processes.

It will be readily understood by those skilled in the art that the calculating circuit of FIG. 5 can also be formed to calculate a linear summation of desired elements of the autocorrelation function $C_i(\tau)$ by modifying the program.

What is claimed is:

1. A receiving circuit for use in a transmission system of a digital signal at a transmission baud rate, said receiving circuit comprising:
   a baud rate sampling circuit for sampling said digital signal as a received signal by a sampling signal having a sampling rate equal to said transmission baud rate to produce a series of sampled signals;
   calculating means, operatively connected to said baud rate sampling circuit, for calculating at least one element of an autocorrelation function of said series of sampled signals as a power of said series of sampled signals; and
   sampling control means responsive to said power for controlling a sampling phase of said sampling signal so that said power is maximized.

2. A receiving circuit as claimed in claim 1, wherein said calculating means calculates a plurality of elements of said autocorrelation function of said series of sampled signals, and calculates a linear sum of said plurality of elements of said autocorrelation function as said power.

3. A receiving circuit as claimed in claim 1, wherein said receiving circuit further comprises digital filter means for filtering said series of sampled signals.

4. In a receiving circuit for use in a transmission system of a digital signal at a transmission baud rate, said receiving circuit comprising a baud rate sampling circuit for sampling said digital signal as a received signal by a sampling signal having a sampling rate equal to said transmission baud rate to produce a series of sampled signals, wherein the improvement comprises:
   calculating means coupled with said baud rate sampling circuit for performing an autocorrelation function and for calculating a linear summation of predetermined elements of an autocorrelation function of said series of sampled signals as a power of said series of sampled signals, said calculating means comprising first means for calculating said predetermined elements of the autocorrelation function of said series of sampled signals to produce calculated data signals, second means for summing said calculated data signal to produce a summed data signal, and third means for integrating said summed data signal for a predetermined time period to produce an integrated signal as said linear summation; and
   sampling control means responsive to said power for controlling a sampling phase of said sampling signal so that said power is maximized.

5. A receiving circuit as claimed in claim 4, which further comprises a digital filter for filtering and delivering said series of sampled signals to said calculating means.

6. A receiving circuit as claimed in claim 5, wherein said digital filter has a filtering characteristic of (1−D).

7. A receiving circuit as claimed in claim 4, wherein said first means comprises a predetermined number of delay means each having a delaying time equal to a sampling period corresponding to said sampling rate and being connected in a cascade for delaying said series of sampled signals, each delay means delivering delayed signals, and a plurality of multiplying means coupled with said delay means, respectively, to multiply said delayed signals by said series of sampled signals to produce said calculated data signals, respectively.

8. A receiving circuit as claimed in claim 4, wherein said third means comprises adder means for adding said summed data signal and an adding signal to produce an added signal, and delaying means for delaying said added signal to produce said integrated signal, said integrated signal being supplied to said adder means as said adding signal.

9. In a receiving circuit for use in a transmission system of a digital signal at a transmission baud rate, said receiving circuit comprising a baud rate sampling circuit for sampling said digital signal as a received signal by a sampling signal having a sampling rate equal to said transmission baud rate to produce a series of sampled signals, wherein the improvement comprises:

calculating means coupled with said baud rate sampling circuit for performing an autocorrelation function and for calculating a linear summation of predetermined elements of an autocorrelation function of said series of sampled signals as a power of said series of sampled signals, said calculating means comprising a read only memory for memorizing a program for calculating said linear summation, a random access memory for storing said series of the sampled signals, and processing means for executing said calculating program to produce said linear summation as said power in cooperation with said read only memory and said random access memory; and sampling control means responsive to said power for controlling a sampling phase of said sampling signal so that said power is maximized.

* * * * *